US012511479B2

(12) United States Patent
Chen et al.

(10) Patent No.: US 12,511,479 B2
(45) Date of Patent: Dec. 30, 2025

(54) SYSTEMS AND METHODS FOR IN-CONTEXT LEARNING USING SMALL-SCALE LANGUAGE MODELS

(71) Applicant: Salesforce, Inc., San Francisco, CA (US)

(72) Inventors: Hailin Chen, Singapore (SG); Shafiq Rayhan Joty, San Jose, CA (US); Amrita Saha, Singapore (SG); Chu Hong Hoi, Singapore (SG)

(73) Assignee: Salesforce, Inc., San Francisco, CA (US)

( * ) Notice: Subject to any disclaimer, the term of this patent is extended or adjusted under 35 U.S.C. 154(b) by 378 days.

(21) Appl. No.: 18/316,969

(22) Filed: May 12, 2023

(65) Prior Publication Data

US 2024/0249077 A1 Jul. 25, 2024

Related U.S. Application Data

(60) Provisional application No. 63/480,879, filed on Jan. 20, 2023.

(51) Int. Cl.
*G06F 40/284* (2020.01)
*G06N 3/0455* (2023.01)
*G06N 3/084* (2023.01)

(52) U.S. Cl.
CPC ......... *G06F 40/284* (2020.01); *G06N 3/0455* (2023.01); *G06N 3/084* (2013.01)

(58) Field of Classification Search
CPC .... G06F 40/284; G06N 3/0455; G06N 3/084; G06N 3/044; G06N 3/045
See application file for complete search history.

(56) References Cited

U.S. PATENT DOCUMENTS

2024/0070270 A1* 2/2024 Mace .................... G06F 21/552
2024/0095463 A1* 3/2024 Leary .................... G06F 40/20

OTHER PUBLICATIONS

Zhang et al, Automatic Chain of Thought Prompting in Large Language Models, Oct. 7, 2022, https://arxiv.org/abs/2210.03493 (Year: 2022).*
Taylor et al, Clinical Prompt Learning With Frozen Language Models, https://ieeexplore.ieee.org/abstract/document/10215061, Aug. 11, 2023, pp. 16453-16463 (Year: 2023).*
Li et al, Few-shot code translation via task-adapted prompt learning, Journal of Systems and Software, vol. 212, https://www.sciencedirect.com/science/article/pii/S0164121224000451, Jun. 2024 (Year: 2024).*

* cited by examiner

*Primary Examiner* — Linda Wong
(74) *Attorney, Agent, or Firm* — Haynes and Boone, LLP

(57) ABSTRACT

Embodiments described herein provide a data driven framework that (i) translates demonstration examples to a fixed-length soft prompt—a sequence of soft tokens; and (ii) learns a global (not generated from demonstrations) soft prompt. The framework then combines the global prompt, the translated prompts and the original context to create an augmented context which is given as final input for the backbone LM to use.

20 Claims, 9 Drawing Sheets

| Methods | #params | | Inf-Time | Random | | cls-to-cls | | half-to-cls | |
|---|---|---|---|---|---|---|---|---|---|
| | backbone | tunable | (minutes) | 120 Train → 40 Test tasks | | 45 cls. → 20 cls. tasks | | 23 cls. + 22 non-cls. → 20 cls. | |
| | | | | 8-shot | 16-shot | 8-shot | 16-shot | 8-shot | 16-shot |
| MetaICL-Finetune | 770M | 770M | 8.2 | 33.5(-14.1%) | 37.0(-9.7%) | 38.4(-20.2%) | 38.3(-19.6%) | 39.2(-12.0%) | 40.7(-13.8%) |
| MetaICL-PT | 770M | 0.13M | 5.7 | 28.2(-27.7%) | 32.3(-18.8%) | 27.1(-44.6%) | 25.6(-47.2%) | 29.2(-35.1%) | 39.9(-15.2%) |
| INF-FT | 770M | 770M | 263.8 | 34.9(-7.2%) | 39.2(-0.1%) | 31.7(-34.8%) | 38.4(-18.8%) | 31.7(-29.4%) | 38.4(-18.4%) |
| OPT-66B | 66B | - | 312.5 | 39.8(+9.3%) | 41.0(+7.3%) | 46.3(-3.7%) | 47.0(-0.7%) | 46.3(+4.1%) | 47.0(-0.2%) |
| OPT-30B | 30B | - | 189.6 | 38.0(+4.5%) | 39.2(+2.8%) | 44.3(-7.8%) | 44.3(-6.4%) | 44.3(-0.3%) | 44.3(-5.9%) |
| OPT-13B | 13B | - | 151.4 | 36.1(-0.8%) | 36.8(-3.3%) | 42.0(-12.8%) | 41.5(-12.4%) | 42.0(-5.7%) | 41.5(-12.0%) |
| T5-xxl | 11B | - | 206.4 | 1.0(-99.0%) | 3.0(-99.8%) | 0.4(-99.6%) | 0.0(-100.0%) | 0.4(-99.6%) | 0.0(-100.0%) |
| T5-large | 770M | - | 22.1 | 1.8(-99.9%) | 1.8(-99.9%) | 0.0(-100.0%) | 0.0(-100.0%) | 0.0(-100.0%) | 0.0(-100.0%) |
| PROMPTTRANS | 770M | 26M | 8.0 | 40.0(+0.0%) | 40.0(+0.0%) | 48.2(+0.0%) | 47.6(+0.0%) | 44.5(+0.0%) | 47.1(+0.0%) |

FIG. 9

| Methods | PROMPTTRANS | | | Random | |
|---|---|---|---|---|---|
| | $\|p_a\|$ | $\|p_d\|$ | $\|p_t\|$ | 8-shot | 16-shot |
| PROMPTTRANS | 100 | 20 | 100 | 37.7(+0.0%) | 40.0(+0.0%) |
| MetaICL-Finetune | / | / | / | 33.5(-14.1%) | 37.0(-9.7%) |
| PROMPTTRANS | 50 | = | = | 37.1(-1.4%) | 39.0(-2.0%) |
| PROMPTTRANS | 0 | = | = | 29.5(-34.7%) | 32.7(-17.5%) |
| PROMPTTRANS | = | 10 | = | 38.1(+0.3%) | 40.1(+0.3%) |
| PROMPTTRANS | = | 30 | = | 36.5(-4.4%) | 36.9(-7.8%) |
| PROMPTTRANS | = | = | 50 | 38.1(-0.6%) | 38.6(-3.2%) |
| PROMPTTRANS | = | = | 0 | 35.9(-4.9%) | 37.5(-5.5%) |

FIG. 10

| Methods | Random | |
|---|---|---|
| | 8-shot | 16-shot |
| PROMPTTRANS | 37.7(+0.0%) | 40.0(+0.0%) |
| MetaICL-Finetune | 33.5(-14.1%) | 37.0(-9.7%) |
| PROMPTTRANS-replace-input | 37.2(-5.7%) | 38.5(-7.7%) |
| PROMPTTRANS-replace-all | 20.0(-50.4%) | 13.8(-72.9%) |

FIG. 11

SYSTEMS AND METHODS FOR IN-CONTEXT LEARNING USING SMALL-SCALE LANGUAGE MODELS

CROSS REFERENCES

The instant application is a nonprovisional of and claims priority under 35 U.S.C. 119 to commonly-owned U.S. provisional application No. 63/480,879, filed Jan. 20, 2023, which is hereby expressly incorporated by reference herein in its entirety.

TECHNICAL FIELD

The embodiments relate generally to natural language processing and machine learning systems, and more specifically to systems and methods for in-context learning using small-scale language models.

BACKGROUND

Machine learning systems have been widely used in natural language processing (NPL). Large language models (LMs) like GPT-3 have shown remarkable in-context learning ability, e.g., these models can often perform a new task simply by conditioning on a few demonstration examples in the input context without further training. For example, to predict the sentiment of "It's so dumb it's brilliant!", some demonstration examples are concatenated to the original input "I really enjoyed this movie! Positive. The plot was boring. Negative. It's so dumb it's brilliant!" The large LM is prompted with the concatenated input of demonstration examples and the input sentence to get the expected prediction "Positive."

However, in-context learning ability is often compromised as model size reduces. For example, it is observed that while GPT-3 175B model achieves over 60% accuracy on the synthesized task of removing a symbol from a word, GPT-3 1.3B model can only achieve around 5% accuracy.

Therefore, there is a need for an in-context learning system using small-scale LMs.

BRIEF DESCRIPTION OF THE DRAWINGS

FIGS. 9-14 provide example performance of data experiments conducted for the in-context learning framework described in relation to FIGS. 1-8.

Figure 1:
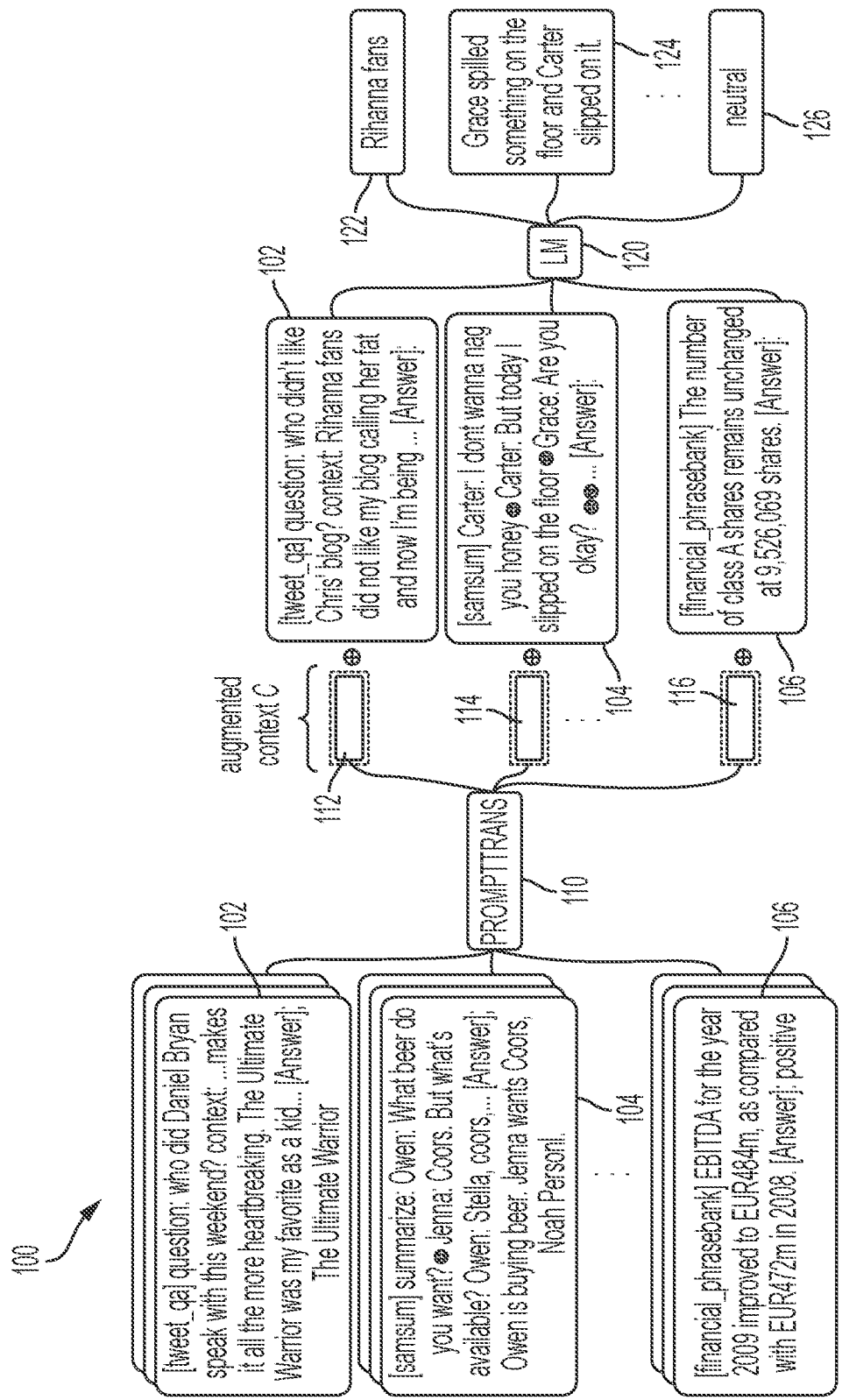
FIG. 1 is a simplified diagram illustrating the in-context learning framework for performing natural language tasks based on augmented contexts generated via prompt translation, according to some embodiments.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Large language models (LMs) like GPT-3 have shown remarkable in-context learning performance, e.g., by concatenating demonstration examples as the input context, the model is able infer on an unseen task without further training. For smaller LMs like T5-large, however, in-context learning performance is highly compromised.

In view of the need to improve in-context learning performance with small LMs, embodiments described herein provide an in-context learning framework that (i) encodes, by a prompt translation model, demonstration examples to fixed-length soft prompts—a sequence of soft tokens; and (ii) generates, via the small LM, a task output based on an input concatenating the soft prompts as augmented context and the input query. A tunable global prompt may also be concatenated as the final input for the backbone LM to use.

Specially, during training, the in-context learning framework is meta-trained on a training dataset of demonstration examples corresponding to a number of NLP tasks, e.g., 120 training tasks. During each iteration in meta-training, the in-context learning framework receives a training pair of demonstration input and output. The in-context learning framework comprising the prompt translation model and the small LM may then generate a predicted output for the demonstration input. The predicted output is then compared with the demonstration output to compute a training loss. The in-context learning framework is then trained based on the training loss via backpropagation: only the prompt translation model is updated while the small LM is kept frozen during backpropagation.

In this way, the prompt translation model may be adapted to help the underlying LM make more accurate predictions when conditioned on the augmented context including the soft tokens. Through such meta-training, the framework (with only a small portion of parameters for the prompt translation model updated) is trained to effectively encode the kind of knowledge that is required by the backbone LM to learn in-context without requiring any parameter update to the LM itself. As further shown in FIGS. 9-14, the in-context learning framework which employs smaller LMs like T5-large as its backbone LM achieves comparable and even superior performance compared to baseline large LMs (such as OPT-13B that has 16.8 times more parameters compared to T5-large). The architecture of the in-context learning framework allows the smaller LMs to outperform large LMs without updating any parameter of the backbone LM itself during training.

In addition, as the in-context learning framework only changes the input context without changing any parameters of the backbone LM or altering its forward propagation step, its strong performance enables smaller LMs to be adopted for learning in-context. The use of smaller backbone LMs largely reduces computational complexity and thus improves system efficiency.

FIG. 1 is a simplified diagram illustrating the in-context learning framework 100 for performing natural language tasks based on augmented contexts generated via prompt translation, according to some embodiments. As shown in FIG. 1, the in-context learning framework 100 comprises a prompt translation model 110 and a language model 120. The language model 120 may be a small-scale LM such as T5-large, and the prompt translation model 110 may be a parameter efficient network, e.g., with only 3.4% parameters of the backbone LM 120.

In one embodiment, the prompt translation model 110 receives few-shot demonstration examples 102, 104, or 106, e.g., each corresponding to a new task. For example, for a given task, for every evaluation instance or query $x^q$, some (e.g., n for n-shot) annotated data $D^s=\{d_i^s=(x_i^s, y_i^s)\}_{i=1}^n$ are provided as demonstrations (a.k.a. support set), as shown as 102, 104, 106 in FIG. 1. $D^s$ (any of 102, 104, 106) is usually few-shot, with $n \leq 16$.

The task of in-context learning framework 100 is to predict $y^q$, the output, conditioned on $D^s$ and $x^q$. Formally $\hat{y}^q = \arg\max_y P_\phi(y|x^q, D^s)$ where $\phi$ is the backbone LM 120. Traditionally, the examples in $D^s$ are concatenated to form the input context C as: $C \leftarrow d_1^s \oplus \ldots \oplus d_n^s$, then concatenate C with $x^q$: $C \oplus x^q$, as the final input to the model.

Here, instead, the prompt translation model 110 converts the demonstration examples 102, 104, or 106 to corresponding augmented contexts C 112, 114, 116, respectively. For example, the augmented contexts may comprise a concatenation of the soft embeddings of the demonstration examples corresponding to each NLP task. Further details of the augmented context may be discussed in relation to FIG. 2.

In one embodiment, each augmented context 112, 114, 116 may then be concatenated with an actual query input of the respective new task (e.g., corresponding to 102, 104, 106, respectively) and fed as input to the backbone LM 120 for the final prediction 122, 124, 126, respectively.

Figure 2:
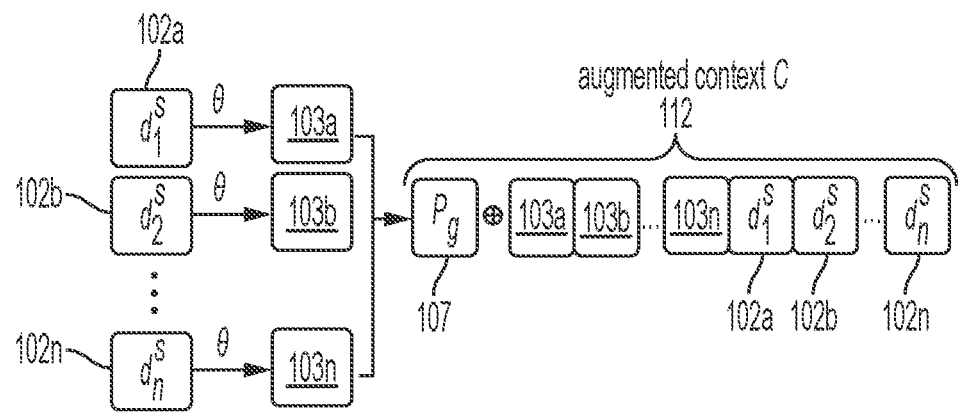
FIG. 2 is a simplified diagram illustrating aspects of augmented context generation for a given task, according to embodiments described herein.

FIG. 2 is a simplified diagram illustrating aspects of augmented context generation for a given task, according to embodiments described herein. The prompt translation model 110, with parameters referred to as θ, may convert the support examples 102a-n $d_i^s=x_i^s \oplus y_i^s$ that correspond to a certain task, to a soft prompt $p_i^s$ 103a-n. The soft prompts 103a-n, in the form of soft tokens, may be better understood by the backbone LM 120 $\phi$ and also guide the LM 120 to solve a new task.

In one embodiment, the translated soft prompts 103a-n $P^s=\{p_i^s\}_{i=1}^n$ are concatenated with the support examples 102a-n $\{d_i^s\}_{i=1}^n$. In some implementations, a learnable soft prompt 107 $p_g$ is left-appended to it to construct the final augmented input context 112 C: $C \leftarrow p_g \oplus p_1^s \oplus \ldots \oplus p_n^s \oplus d_1^s \oplus \ldots \oplus d_n^s$.

In one embodiment, the soft prompt 107 may be reused for different tasks, unlike translated prompts 103a-n $p_i^s$ which is dependent on the support data. The soft prompt 107 $p_g$ is a global soft prompt for a variety of different tasks and is generated from the support set. In this way, the global prompt 107 $p_g$ gives a general context for in-context learning while $p_i^s$ help the backbone LM 120 better understand each support example.

Figure 3:
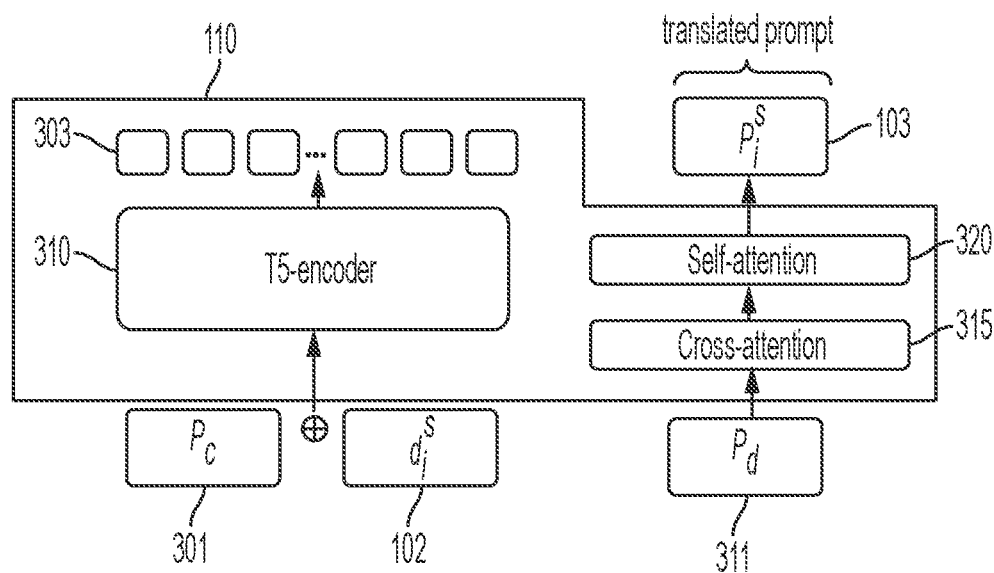
FIG. 3 is a simplified block diagram illustrating an example structure of the prompt translation model in FIG. 1, according to embodiments described herein.

FIG. 3 is a simplified block diagram illustrating an example structure of the prompt translation model 110 in FIG. 1, according to embodiments described herein. In one embodiment, the prompt translation model 110 converts the support set 102 $D^s=\{d_i^s\}_{i=1}^n$ into a set of soft tokens 103 $P^s=\{p_i^s\}_{i=1}^n$. As the demonstration samples 102 are independent and the probability of them appearing together is low in natural text, instead of adopting a seq2seq architecture like the Transformer to generate $P^s$ autoregressively from $D^s$, the prompt translation model 110 adopts an architecture of a non-autoregressive model which independently accepts the demonstration examples and generates the corresponding soft tokens.

Specifically, the prompt translation model 110 comprises a text encoder 310 (e.g., a T5-encoder), a decoder of a cross-attention layer 315 and a self-attention layer 320. Given an input $d_i^s$ 102 of variable length, the input demonstration example 102 is concatenated with a learnable soft prompt $p_e$ 301. The concatenated input is sent to a frozen T5-encoder 310. The variable length output of the T5 encoder, e.g., the encoded vector representation 303, is then passed through a decoder model to get a fixed-length output vector. For example, the decoder comprise a cross-attention layer 315 and a self-attention layer 320. The cross-attention layer 315 takes a learnable decoder soft prompt $p_d \in \mathbb{R}^k$ 311 as input and first performs cross-attention over the decoder prompt 311 and the T5 encoded vector representations 303. The cross attention may result in a contextualized representation, which is further passed through the self-attention layer 320 to generate the final soft token $p_i^s \in \mathbb{R}^k$ 103.

As each $p_i^s$ 103 is only dependent on its corresponding $d_i^s$ 102, the process of translating $d_i^s \rightarrow p_i^s$ for i=1 . . . n can be parallelized. For example, a whole set of demonstration examples $D^s=\{d_i^s\}_{i=1}^n$ may be converted into a set of soft tokens 103 $P^s=\{p_i^s\}_{i=1}^n$, respectively, at the prompt translation model 110 in parallel.

Figure 4:
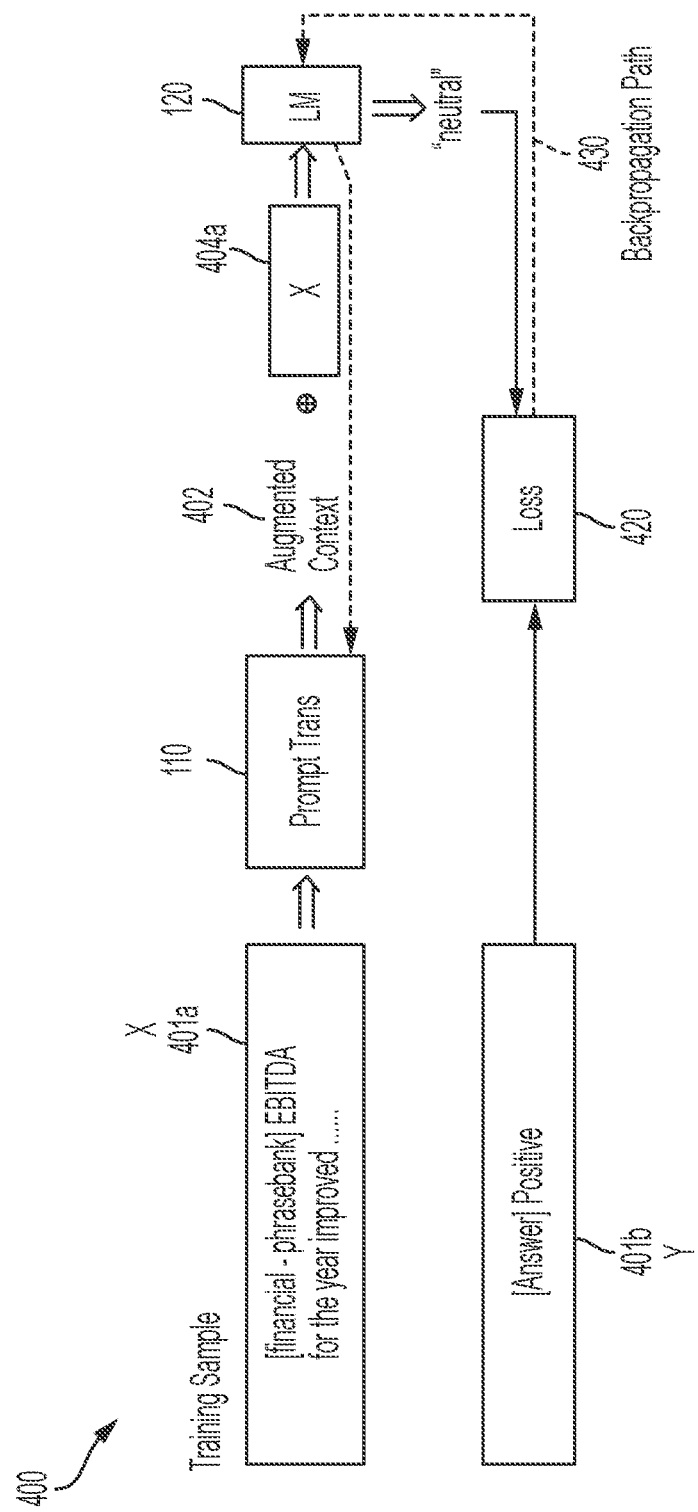
FIG. 4 is a simplified block diagram illustrating aspects of training the in-context learning framework shown in FIG. 1, according to embodiments described herein.

FIG. 4 is a simplified block diagram 400 illustrating aspects of training the in-context learning framework shown in FIG. 1, according to embodiments described herein. In one embodiment, the prompt translation model 110 may be meta-trained with a collection of tasks $\mathbb{T}_{train}$.

For example, for every training iteration, training samples corresponding to a task $\mathcal{T}_{tr}$ is first sampled from the training dataset of $\mathbb{T}_{train}$. Then the training sample corresponding to the sampled task, e.g., including support data $D_{tr}^s$ and one query $d_{tr}^q=(x_{tr}^q, y_{tr}^q)$ 401a-b are sampled from $\mathcal{T}_{tr}$. It is noted that for illustrative purpose only, the training diagram 400 shows the support data $D_{tr}^s$ and the query $d_{tr}^q=(x_{tr}^q, y_{tr}^q)$ both to be 401a-b. In other examples, the support data $D_{tr}^s$ and the query $d_{tr}^q=(x_{tr}^q, y_{tr}^q)$ may be different.

Similar to aspects described in FIGS. 1-3, the prompt translation model 110 may convert $D_{tr}^s$ to input context C 402 and feed C with query input $x_{tr}^q$ 401a to the LM 120 to predict the output $y_{tr}^q$. A cross entropy loss 420 may be computed on the final prediction from the LM 120 as compared with the query output 401b as the training loss:

$$\mathcal{L}^{meta}(\theta') = \mathbb{E}_{D_{tr}^s, d_{tr}^q \sim \mathcal{T}_{tr}}[-\log P_\phi(y_{tr}^q | C \oplus x_{tr}^q)] \quad (1)$$

where θ'{θ, $p_g$} denote the combination of the tunable parameters of the prompt translation network 110 and the tunable global prompt 107 in FIG. 2. The in-context learning framework may then be updated based on the training loss 420 via the backpropagation path 430, while tθ'{θ, $p_g$} is updated but the LM 120 is kept frozen along the backpropagation path 430. The tunable parameters of the prompt translation network 110 may further comprise the tunable encoder prompt 301, parameters of the cross-attention layer 315 and the self-attention layer 320, and the tunable decoder prompt 311. The T5-encoder 310 within the prompt translation model 110 is also kept frozen during training.

In some embodiments, the trained prompt translation model 110 may be evaluated with a collection of unseen tasks $\mathbb{T}_{test}$. Each target task $\mathcal{T} \in \mathbb{T}_{test}$ consists of multiple support and query data pairs. For each pair($D^s$, $d^g$), $D^s$ may be fed as input to the prompt translation model 110 to get the output context C, which is then concatenated to $x^q$ (i.e. $C \oplus x^q$) and passed to the backbone LM model 120 to get the final prediction: $\hat{y}^q \leftarrow \arg\max_y P_\varnothing(y | C \oplus x^q)$.

Figure 5:
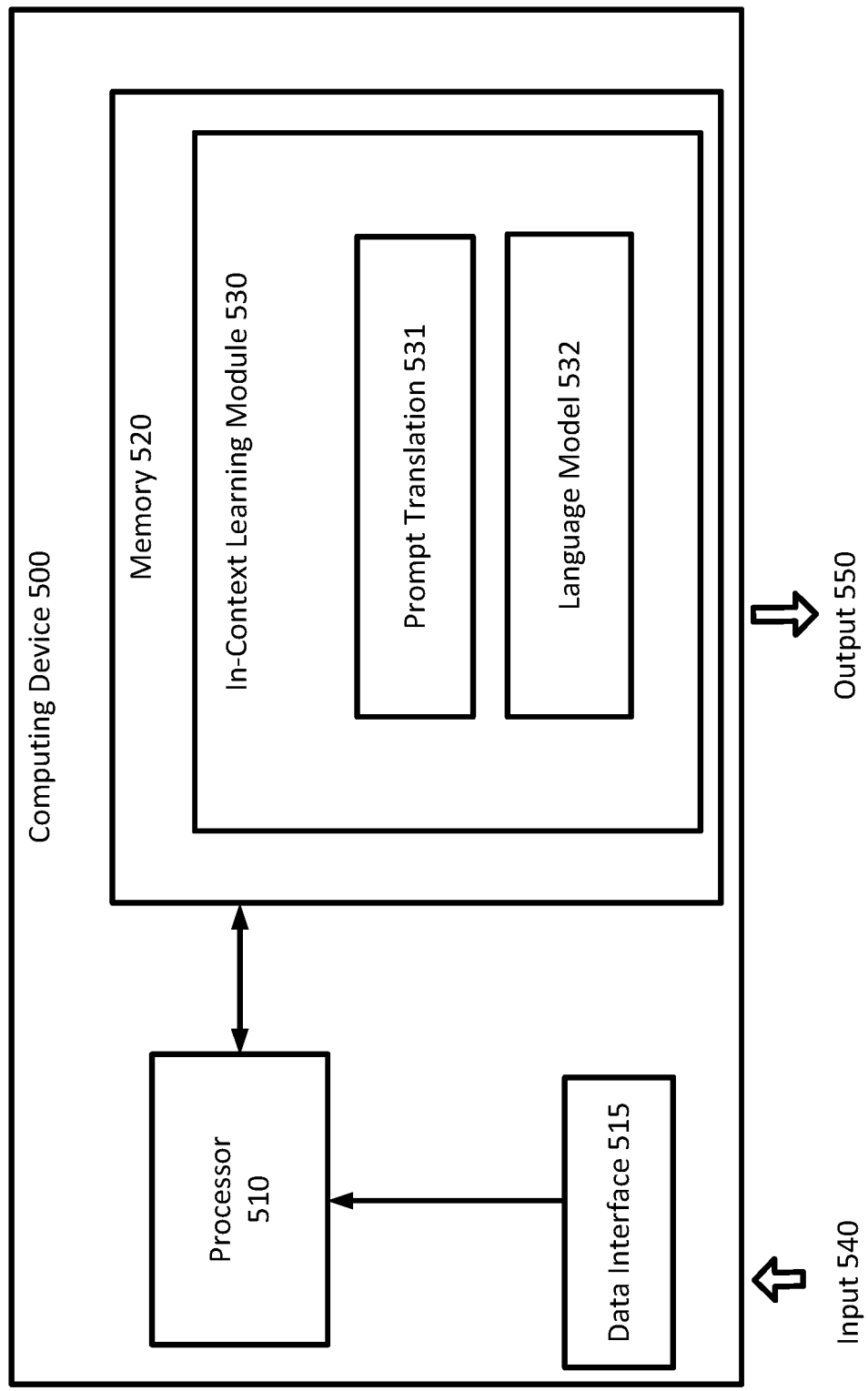
FIG. 5 is a simplified diagram illustrating a computing device implementing the prompt translation framework described in FIG. 1, according to one embodiment described herein.

FIG. 5 is a simplified diagram illustrating a computing device implementing the prompt translation framework described in FIG. 1, according to one embodiment described herein. As shown in FIG. 5, computing device 500 includes a processor 510 coupled to memory 520. Operation of computing device 500 is controlled by processor 510. And although computing device 500 is shown with only one processor 510, it is understood that processor 510 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 500. Computing device 500 may be implemented as a stand-alone subsystem, as a board added to a computing device, and/or as a virtual machine.

Memory 520 may be used to store software executed by computing device 500 and/or one or more data structures used during operation of computing device 500. Memory 520 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 510 and/or memory 520 may be arranged in any suitable physical arrangement. In some embodiments, processor 510 and/or memory 520 may be implemented on a same board, in a same package (e.g., system-in-package), on a same chip (e.g., system-on-chip), and/or the like. In some embodiments, processor 510 and/or memory 520 may include distributed, virtualized, and/or containerized computing resources. Consistent with such embodiments, processor 510 and/or memory 520 may be located in one or more data centers and/or cloud computing facilities.

In some examples, memory 520 may include non-transitory, tangible, machine readable media that includes executable code that when run by one or more processors (e.g., processor 510) may cause the one or more processors to perform the methods described in further detail herein. For example, as shown, memory 520 includes instructions for in-context learning module 530 that may be used to implement and/or emulate the systems and models, and/or to implement any of the methods described further herein. The in-context learning module 530 may receive input 540 such as an input training data or demonstration examples via the data interface 515 and generate an output 550 which may be a task output, such as an intent classification of an input sentence.

The data interface 515 may comprise a communication interface, a user interface (such as a voice input interface, a graphical user interface, and/or the like). For example, the computing device 500 may receive the input 540 (such as a training dataset) from a networked database via a communication interface. Or the computing device 500 may receive the input 540, such as an input sentence or a question, from a user via the user interface.

In some embodiments, the in-context learning module 530 is configured to generate an output 550 for an unseen task using a demonstration example as part of the input. The in-context learning module 530 may further include prompt translation submodule 531 (e.g., similar to 110 in FIG. 1) and a language model 532 (e.g., similar to 120 in FIG. 1).

Specifically, as described in FIG. 1, the prompt translation submodule 531 receives task demonstrations from input 540 and generates an augmented context C for each task. The augmented context C is concatenated with the actual query of each task (from input 540) is fed as input to the language model 532 to produce the final prediction output 550.

In one embodiment, the in-context learning module 530 and its submodules 531-532 may be implemented by hardware, software and/or a combination thereof. For example, the in-context learning module 530 and one or more of its submodules 531-532 may be implemented via an artificial neural network. The neural network comprises a computing system that is built on a collection of connected units or nodes, referred as neurons. Each neuron receives an input signal and then generates an output by a non-linear transformation of the input signal. Neurons are often connected by edges, and an adjustable weight is often associated to the edge. The neurons are often aggregated into layers such that different layers may perform different transformations on the respective input and output transformed input data onto the next layer. Therefore, the neural network may be stored at memory 520 as a structure of layers of neurons, and parameters describing the non-linear transformation at each neuron and the weights associated with edges connecting the neurons. An example neural network may be T5-large, and/or the like.

In one embodiment, the neural network based in-context learning module 530 and one or more of its submodules 531 may be trained by updating the underlying parameters of the neural network based on a training objective, e.g., loss. For example, the loss (e.g., Eq. (1)) is a metric that evaluates how far away a neural network model generates a predicted output value from its target output value (also referred to as the "ground-truth" value). Given the loss, the negative gradient of the loss function is computed with respect to each weight of each layer individually. Such negative gradient is computed one layer at a time, iteratively backward from the last layer to the input layer of the neural network. Parameters of the neural network are updated backwardly from the last layer to the input layer (backpropagating) based on the computed negative gradient to minimize the loss. The backpropagation from the last layer to the input layer may be conducted for a number of training samples in a number of training epochs. In this way, parameters of the neural network may be updated in a direction to result in a lesser or minimized loss, indicating the neural network has been trained to generate a predicted output value closer to the target output value.

In one embodiment, the prompt translation submodule 531 may be a parameter efficient neural network, with only 3.4% parameters of the backbone LM (T5-large) 532 and thus can be easily deployed to multiple accelerators (GPUs, TPUs) for multi-task inference. Since the backbone LM is kept frozen during training, the overall in-context learning framework (module 530) enjoys the same in-batch multi-task inference capability as soft prompt tuning and LM-as-a-service.

Some examples of computing devices, such as computing device 500 may include non-transitory, tangible, machine readable media that include executable code that when run by one or more processors (e.g., processor 510) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 6:
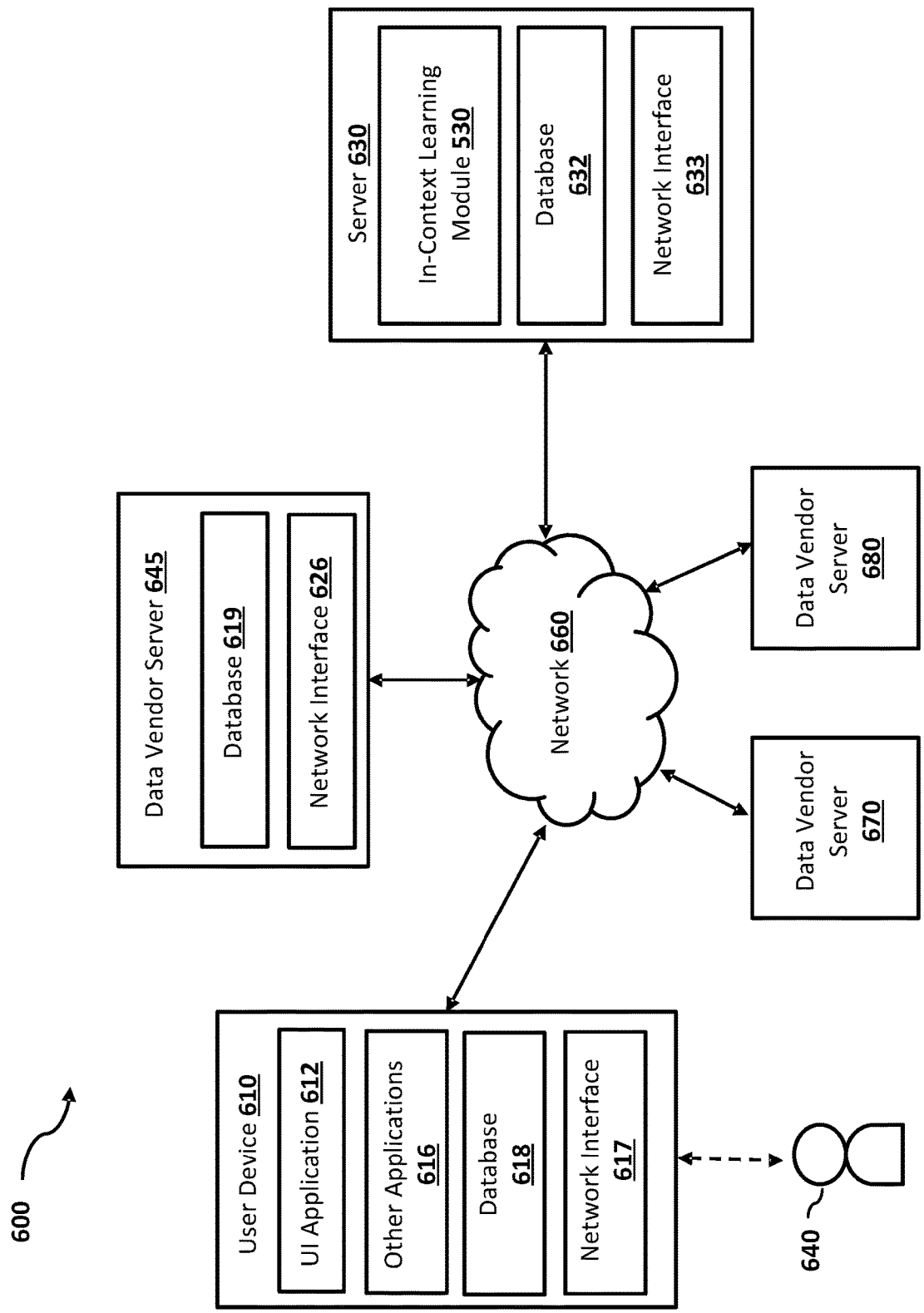
FIG. 6 is a simplified block diagram of a networked system suitable for implementing the prompt translation framework described in FIGS. 1-2 and other embodiments described herein.

FIG. 6 is a simplified block diagram of a networked system 600 suitable for implementing the prompt translation framework described in FIGS. 1-2 and other embodiments described herein. In one embodiment, system 600 includes the user device 610 which may be operated by user 640, data vendor servers 645, 670 and 680, server 630, and other forms of devices, servers, and/or software components that operate to perform various methodologies in accordance with the described embodiments. Exemplary devices and servers may include device, stand-alone, and enterprise-class servers which may be similar to the computing device 200 described in FIG. 2, operating an OS such as a MICROSOFT® OS, a UNIX® OS, a LINUX® OS, or other suitable device and/or server-based OS. It can be appreciated that the devices and/or servers illustrated in FIG. 6 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 610, data vendor servers 645, 670 and 680, and the server 630 may communicate with each other over a network 660. User device 610 may be utilized by a user 640 (e.g., a driver, a system admin, etc.) to access the various features available for user device 610, which may include processes and/or applications associated with the server 630 to receive an output data anomaly report.

User device 610, data vendor server 645, and the server 630 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 600, and/or accessible over network 660.

User device 610 may be implemented as a communication device that may utilize appropriate hardware and software configured for wired and/or wireless communication with data vendor server 645 and/or the server 630. For example, in one embodiment, user device 610 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 610 of FIG. 6 contains a user interface (UI) application 612, and/or other applications 616, which may correspond to executable processes, procedures, and/or applications with associated hardware. For example, the user device 610 may receive a message indicating a task output such as an intent classification, or an answer to a question from the server 630 and display the message via the UI application 612. In other embodiments, user device 610 may include additional or different modules having specialized hardware and/or software as required.

In various embodiments, user device 610 includes other applications 616 as may be desired in particular embodiments to provide features to user device 610. For example, other applications 616 may include security applications for implementing client-side security features, programmatic client applications for interfacing with appropriate application programming interfaces (APIs) over network 660, or other types of applications. Other applications 616 may also include communication applications, such as email, texting, voice, social networking, and IM applications that allow a user to send and receive emails, calls, texts, and other notifications through network 660. For example, the other application 616 may be an email or instant messaging application that receives a prediction result message from the server 630. Other applications 616 may include device interfaces and other display modules that may receive input and/or output information. For example, other applications 616 may contain software programs for asset management, executable by a processor, including a graphical user interface (GUI) configured to provide an interface to the user 640 to view the task output.

User device 610 may further include database 618 stored in a transitory and/or non-transitory memory of user device 610, which may store various applications and data and be utilized during execution of various modules of user device 610. Database 618 may store user profile relating to the user 640, predictions previously viewed or saved by the user 640, historical data received from the server 630, and/or the like. In some embodiments, database 618 may be local to user device 610. However, in other embodiments, database 618 may be external to user device 610 and accessible by user device 610, including cloud storage systems and/or databases that are accessible over network 660.

User device 610 includes at least one network interface component 617 adapted to communicate with data vendor server 645 and/or the server 630. In various embodiments, network interface component 617 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 645 may correspond to a server that hosts database 619 to provide training datasets including demonstration examples to the server 630. The database 619 may be implemented by one or more relational database, distributed databases, cloud databases, and/or the like.

The data vendor server 645 includes at least one network interface component 626 adapted to communicate with user device 610 and/or the server 630. In various embodiments, network interface component 626 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 645 may send asset information from the database 619, via the network interface 626, to the server 630.

The server 630 may be housed with the in-context learning module 530 and its submodules described in FIG. 5. In some implementations, in-context learning module 530 may receive data from database 619 at the data vendor server 645 via the network 660 to generate a task output. The generated task output may also be sent to the user device 610 for review by the user 640 via the network 660.

The database 632 may be stored in a transitory and/or non-transitory memory of the server 630. In one implementation, the database 632 may store data obtained from the data vendor server 645. In one implementation, the database 632 may store parameters of the in-context learning module 530. In one implementation, the database 632 may store previously generated task outputs, demonstration examples, and the corresponding input feature vectors.

In some embodiments, database 632 may be local to the server 630. However, in other embodiments, database 632 may be external to the server 630 and accessible by the server 630, including cloud storage systems and/or databases that are accessible over network 660.

The server 630 includes at least one network interface component 633 adapted to communicate with user device 610 and/or data vendor servers 645, 670 or 680 over network 660. In various embodiments, network interface component 633 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 660 may be implemented as a single network or a combination of multiple networks. For example, in various embodiments, network 660 may include the Internet or one or more intranets, landline networks, wireless networks, and/or other appropriate types of networks. Thus, network 660 may correspond to small scale communication networks, such as a private or local area network, or a larger scale network, such as a wide area network or the Internet, accessible by the various components of system 600.

Figure 7:
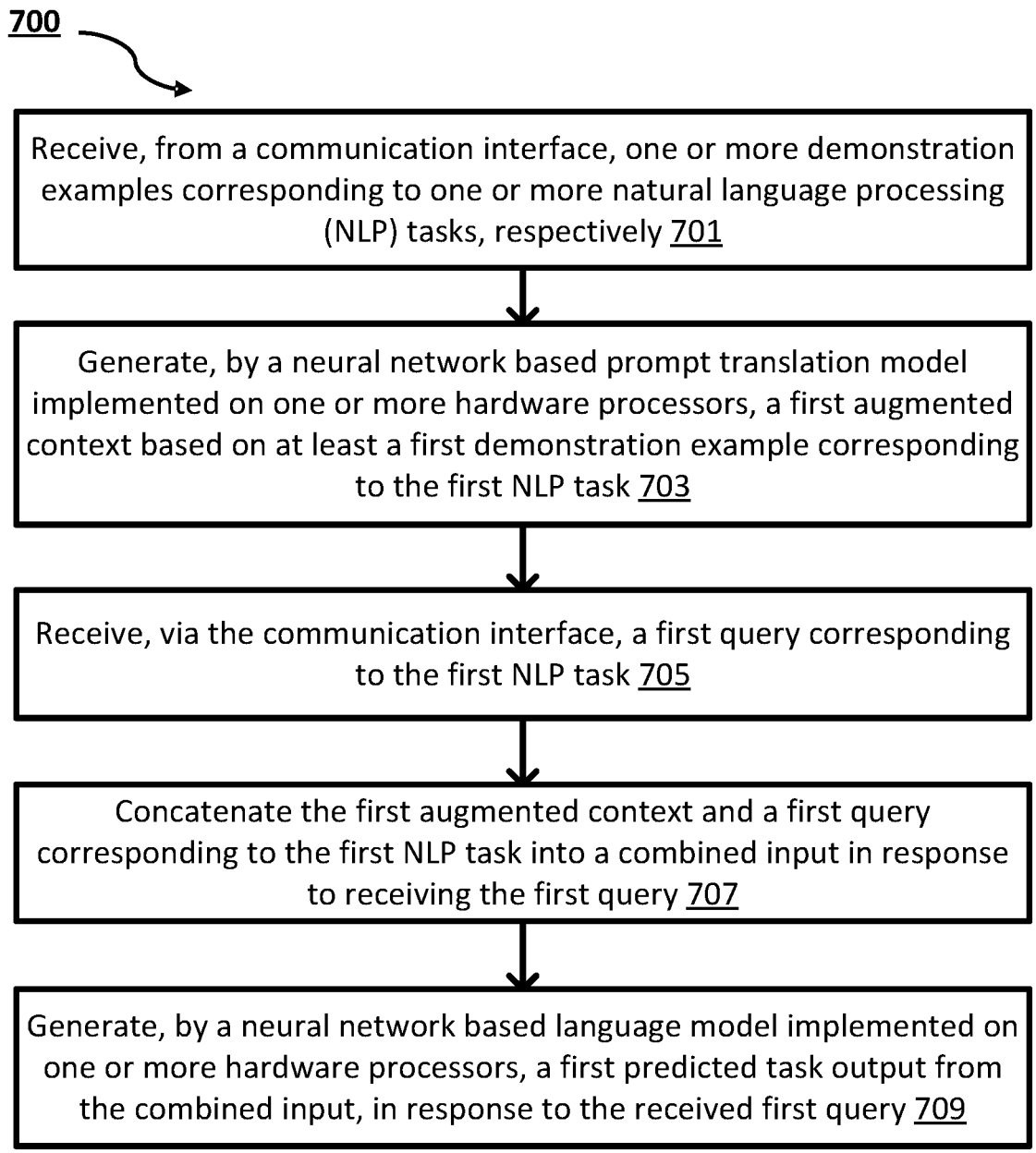
FIG. 7 is an example logic flow diagram illustrating a method of in-context learning based on the framework shown in FIGS. 1-6, according to some embodiments described herein.

FIG. 7 is an example logic flow diagram illustrating a method of in-context learning based on the framework shown in FIGS. 1-6, according to some embodiments described herein. One or more of the processes of method 700 may be implemented, at least in part, in the form of executable code stored on non-transitory, tangible, machine-readable media that when run by one or more processors may cause the one or more processors to perform one or more of the processes. In some embodiments, method 700 corresponds to the operation of the in-context learning module 530 (e.g., FIGS. 5-6) that generates an output for an unseen task based on demonstration examples.

As illustrated, the method 700 includes a number of enumerated steps, but aspects of the method 700 may include additional steps before, after, and in between the enumerated steps. In some aspects, one or more of the enumerated steps may be omitted or performed in a different order.

At step 701, one or more demonstration examples (e.g., 102, 104, 106 in FIG. 1) corresponding to one or more natural language processing (NLP) tasks, respectively, may be received, via a data interface (e.g., data interface 515 in FIG. 5, or network interface 633 in FIG. 6). For example, a demonstration example includes a first token indicating a type of the first NLP task, e.g., "[tweet_qa]," a first text of a task input (e.g., "question: who did Daniel Bryan speak with this weekend? context: . . . makes it all the more heartbreaking. The ultimate Warrior was my favorite as a kid . . . ") and a second text of a task output corresponding to the NLP task (e.g., "[Answer] The Ultimate Warrior").

At step 703, a neural network based prompt translation model (e.g., 110 in FIG. 1) implemented on one or more hardware processors (e.g., processor 510 in FIG. 5) may generate a first augmented context (e.g., 112 in FIGS. 1-2) based on at least a first demonstration example (e.g., 102*a-n* in FIG. 2) corresponding to the first NLP task (e.g., "tweet_qa"). For example, the neural network based prompt translation model may generate one or more soft prompts (e.g., 103*a-n* in FIG. 2) from one or more demonstration examples (e.g., 102*a-n* in FIG. 2) corresponding to the first NLP task, respectively. The soft prompts may be generated first by an encoder (e.g., 310 in FIG. 3) of the neural network based prompt translation model encoding a concatenation of a tunable encoder prompt (e.g., 301 in FIG. 3) and at least one demonstration examples (e.g., 102 in FIG. 3) into an encoded representation (e.g., 303 in FIG. 3), and then by a decoder (e.g., attention layers 315 and 320 in FIG. 3) of the neural network in based prompt translation model generating at least one soft prompt (e.g., 103 in FIG. 3) from the encoded representation and a tunable decoder prompt (e.g., 311 in FIG. 3). In this way, for any given new task, demonstrations corresponding to the new task only needs to be translated once, and the same new task can be performed at multiple turns at inference. Thus, the in-context learning system described herein can adapt to any new task in a short amount of time (e.g., nearly in real time). As shown in FIG. 9, adaptation time is 8 minutes for 2K task examples with 8 A100 GPUs, which is less than 2 second latency for any new task adaptation.

In some implementations, steps 701-703 to compute the augmented context for a certain task may be pre-computed prior to receiving an actual query input at inference time. In this way, the computed augmented context for the certain task may be reused by the neural network based language model implemented on one or more hardware processors to generate various predicted task outputs from a concatenation of the augmented context and query inputs corresponding to the NLP task, in response to receiving the query input.

At step 705, a query input corresponding to the first NLP task may be received via the communication interface. For example, the query input may be obtained from a user, via articulation, or manual input. For another example, the query input may be obtained from a database.

At step 707, the first augmented context and the first query corresponding to the first NLP task may be concatenated into a combined input in response to receiving the first query. For example, the first augmented context (e.g., 112 in FIG. 2) is generated by concatenating a tunable global prompt (e.g., 107 in FIG. 2), the one or more soft prompts (e.g., 103a-n in FIG. 2) and the one or more demonstration examples (e.g., 102a-n in FIG. 2).

At step 709, a neural network based language model (e.g., 120 in FIG. 1) implemented on one or more hardware processors (e.g., processor 510 in FIG. 5) may generate a first predicted task output (e.g., 122, 124, 126 in FIG. 1) from the combined input, in response to the received first query.

Figure 8:
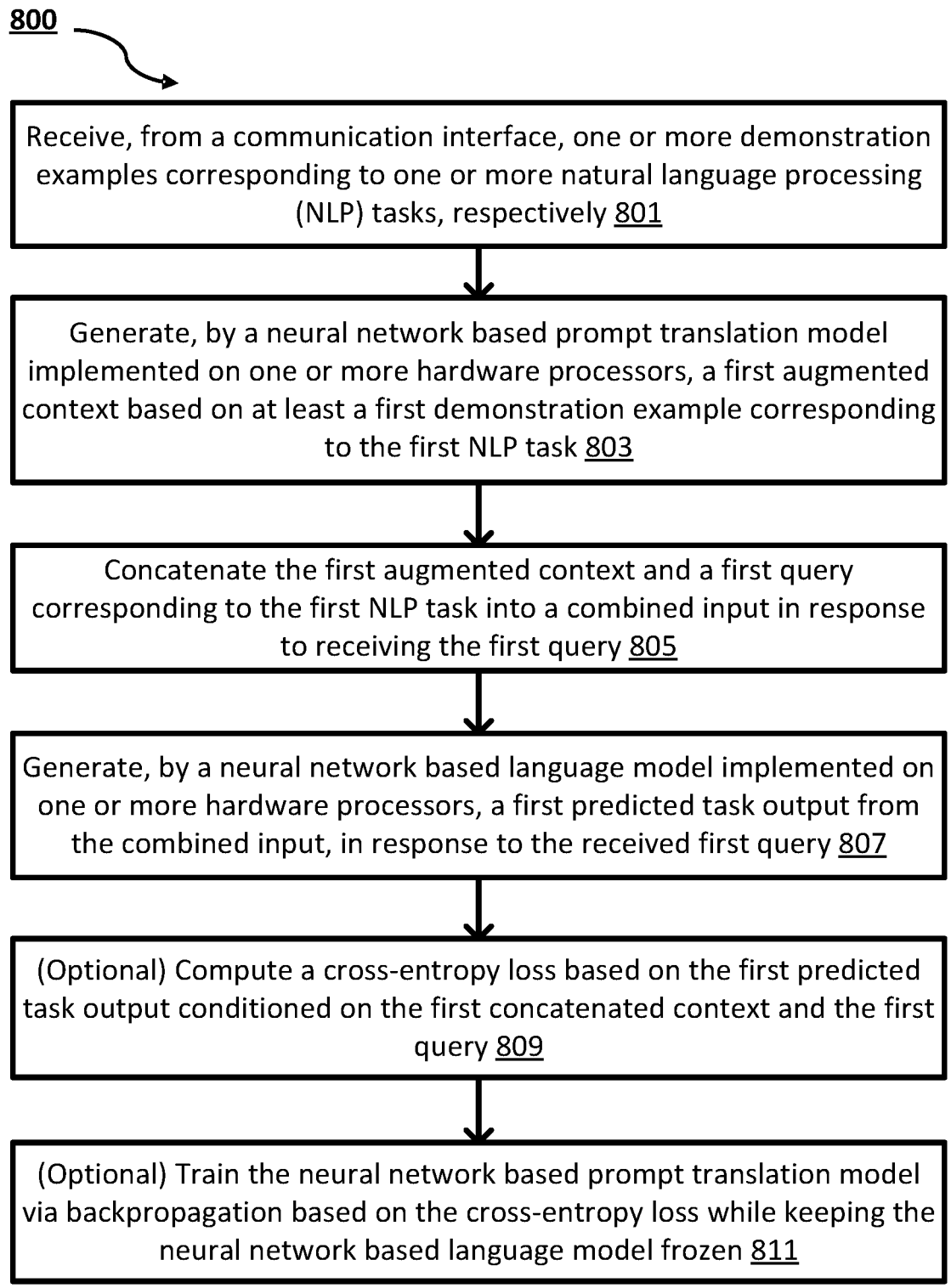
FIG. 8 is an example logic flow diagram illustrating a method of training an in-context learning framework shown in FIGS. 1-6, according to some embodiments described herein.

FIG. 8 is an example logic flow diagram illustrating a method of training an in-context learning framework shown in FIGS. 1-6, according to some embodiments described herein. One or more of the processes of method 800 may be implemented, at least in part, in the form of executable code stored on non-transitory, tangible, machine-readable media that when run by one or more processors may cause the one or more processors to perform one or more of the processes. In some embodiments, method 800 corresponds to the operation of the in-context learning module 530 (e.g., FIGS. 5-6) that generates an output for an unseen task based on demonstration examples.

As illustrated, the method 800 includes a number of enumerated steps, but aspects of the method 700 may include additional steps before, after, and in between the enumerated steps. In some aspects, one or more of the enumerated steps may be omitted or performed in a different order.

Steps 801-807 may be similar to steps 701-707 in FIG. 7, as the first query belongs to a training example sampled from a training dataset. At step 809, a cross-entropy loss (e.g., 420 in FIG. 4) may be computed based on the first predicted task output conditioned on the first concatenated context (e.g., 402 in FIG. 4) and the first query (e.g., 401a in FIG. 4), e.g., Eq. (1).

At step 811, the neural network based prompt translation model may be trained via backpropagation based on the cross-entropy loss while keeping the neural network based language model frozen. For example, parameters of attention layers (e.g., 315 and 320 in FIG. 3) within the neural network based prompt translation model, a tunable decoder prompt (e.g., 311 in FIG. 3) and an encoder prompt (e.g., 301 in FIG. 3) that are used within the neural network based prompt translation model, and a global prompt (e.g., 107 in FIG. 2) that is concatenated within the first augmented context may be updated during backpropagation at each training iteration.

FIGS. 9-14 provide example performance of data experiments conducted for the in-context learning framework described in relation to FIGS. 1-8. The CROSSFIT (Ye et al., Crossfit: A few-shot learning challenge for cross-task generalization in NLP, in Proceedings of Empirical Methods in Natural Language Processing (EMNLP), pp. 7163-7189, 2021) dataset is used for meta training and evaluation. Primarily, three partitions are considered: Random, cis-to-cls and half-to-cls. As shown in FIG. 9, each partition contains a collection of meta-training and evaluation tasks. Each task has its own training set $\mathcal{D}^{train}$ and development set $\mathcal{D}^{dev}$. There are 80 examples per class in $\mathcal{D}^{train}$ or $\mathcal{D}^{dev}$ for classification and regression tasks, and 160 examples for other tasks. During meta training, support data $\mathcal{D}_{tr}^{s}$, is sampled from $\mathcal{D}_{tr}^{train}$ and query data $d_{tr}^{q}$ is sampled from $\mathcal{D}_{tr}^{dev}$. The evaluation data is constructed by sampling 50 pairs of $(D^s, d^q)$ for each evaluation task $\mathcal{T} \in \mathbb{T}_{test}$ on Random partition and 100 pairs for each task in other two partitions, resulting in 2 k in-context learning test instances for each partition.

In one embodiment, T5-large (Raffel et al., Exploring the limits of transfer learning with a unified text-to-text transformer, Journal of Machine Learning and Representation, 21:140:1-140:67, 2020) is used as the backbone LM 120 across all experiments. Example baselines to compare with include: MetaICL-Finetune which finetunes the backbone LM during the meta-training stage (Min et al., MetaICL: Learning to learn in context, in proceedings of Annual Conference of the North American Chapter of the Association for Computational Linguistics (NAACL)-Human Language Technologies (HLT), pp. 2791-2809, 2022). MetaICL-PT does soft prompt tuning (Lester et al., the power of scale for parameter-efficient prompt tuning, in proceedings of EMNLP, pp. 3045-3059, 2021) during meta-training stage—it appends a global soft to input context and tunes only on that soft prompt while keeping the backbone LM frozen. INF-Finetune optimizes the LM during testing with $D^s$, without involving any meta-training. This falls back to conventional finetuning on annotated data $D^s$ instead of in-context learning. Specifically, given $(D^s, d^q)$ pair during inference, we finetune the backbone LM for 100 steps on $D^s$ and use the finetuned model to infer on $d^q$. This process is repeated for each test data point. Off-the-shelf LM uses the off-the-shelf backbone LM for inference on in-context learning data. For this baseline, results on different LM backbones are reported, including T5-{large,xxl}(Raffel et al.) and OPT-{13B, 30B, 66B} (Zhang et al., OPT: open pretrained transformer language models, Computer Research Repository (CoRR), abs/2205.01068, 2022).

To summarize, amongst all models, only MetaICL and the proposed in-context learning described herein perform meta-training. The demonstration context is appended to input for all models other than INF-FT which instead uses it finetune the LM parameters during inference.

Example task-specific evaluation metrics include: Classification-F1, Accuracy, QA-F1, Exact Match (EM), Rouge-L, Mattew correlation and Pearson correlation. To evaluate a model on a collection of tasks, the following metrics are adopted: average of task-specific performances (Avg) and Weighted Geometric Mean of Relative Gain per task group (wGMRG). For wGMRG, task groups are constructed out of tasks having the same evaluation metric. Computing average relative gain per task group allows a more stable evaluation then average relative gain per specific task. For example, suppose the relative performance ratio per task group is: $r=(r_1, \ldots, r_n)$, the size ratio for each task group is: $w=(w_1, \ldots, w_n)$. Then wGMRG is computed by $\Pi_{i=1}^{n} r_i^{w_i} - 1$. For example, say model1 performs 1.2× better than Model2 in QA-F1 category and achieves only 0.9× of Model2's scores in Rouge-L tasks, then the then supposing there are 2 QA-F1 tasks and 1 Rouge-L task, then the wGMRG is $(1.2^{2/3} \times 0.9^{1/3}) - 1 \approx +9\%$.

In some implementations, the data experiments use a learning rate of 1e-5 for MetaICL-PT baseline and 5e-5 for MetaICL-Finetune and INF-Finetune baselines. For the in-context learning framework described herein, 1e-5 learning rate is set for tunable soft prompts $\{p_e, p_d, p_g\}$ and 5e-5 for parameters in 1-layer decoder. All experiments use Adam optimizer with batch size 8, weight decay of 1e-5 and 150 warm-up steps. For each partition, 400 training epochs for 16-shot support setting and 200 epochs for 8-shot support.

For each epoch, a single data point (i.e. support set and a query) is sampled from each training task. The numbers of soft tokens for {$p_e, p_d, p_g$} are set to {100,30,100}. The number of soft tokens for MetaICL-PT is 2003. To ensure a fair comparison with comparable inference costs, the max context length of concatenated support examples is set to 1024 tokens for MetaICL-{Finetune,PT} and 512 tokens for the in-context learning described herein. The max output length is set to 64 for all models. All experiments are carried out on eight 40 GB A100 GPUs and 400 epochs of training on Random partition takes around 3.3 hours.

FIG. 9 shows example results of the in-context learning framework 100 compared with baselines, under 3 partitions. Overall, it is observed similar trend over compared models across all settings. For example, T5-large off-the-shelf cannot learn in-context T5-large and T5-xxl off-the-shelf baselines (row 7-8) shows nearly zero performance on all three partitions, which indicates that T5 is not amenable to in-context learning. However, it is observed that the in-context learning framework 100 even without changing T5-large parameters, is able to elicit in-context learning and achieve either best results (in cis-to-cls/half-to-cls partition) or close to best results (in Random partition), out of all the baselines. Such empirical results strongly suggest that LMs considered not suitable for in-context learning (like T5-large) are inherently capable of it. The key factor to elicit its in-context ability is to use the prompt translation network 110 to construct better context representation.

FIG. 9 also shows the in-context learning framework 100 consistently outperforms MetaICL methods. The first row block shows our MetaICL baselines. MetaICL-Finetune demonstrates effective in-context learning ability. Although MetaICL-Finetune trains the whole T5-large (770M parameters), in-context learning framework 10 consistently outperforms it in all settings while only tuning 3.4% of T5-large parameters and keeping the backbone LM fixed. This shows that finetuning the LM parameters for explicit meta-training is neither necessary nor optimal. On the other hand, Meta-ICL-PT keeps the backbone LM frozen like in-context learning framework 100 but its performance is significantly compromised: 7-22 points below in-context learning framework 10 across 3 partitions. Such performance gap suggests that translating the demonstration examples to soft prompts is indeed crucial to elicit strong in-context learning of backbone LMs.

The in-context learning framework 100 also yields better results than INF-FT Finetuning the backbone LM used to be the default paradigm to adapt LMs to downstream tasks. Here it is observed that in-context learning framework 100 consistently outperforms INF-FT, with up to 16 points advantage. In other words, with in-context learning framework 100, T5-large is better at in-context learning on few-shot data than finetuning itself.

The in-context learning framework 100 can even be comparable with large LMs. It is observed that strong in-context learning performance from large LMs like OPT-{66B,30B,13B}. Remarkably, in-context learning framework 100 on T5-large is able to outperform OPT-66B model in cis-to-cls, surpass OPT-30B in half-to-cls and achieve performance comparable to OPT-30B in Random. It is also observed that with better context representation from in-context learning framework 100, small LMs like T5-large can consistently outperform OPT-13B having 16.8× parameters.

Inference is fast for in-context learning framework 100. The average time to predict on 2 k test data across 6 settings (3 partitions {8-shot, 16-shot}) is recorded, on eight 40 GB GPUs with batch size 1 per GPU. Firstly, it is observed that in-context learning framework 100 has one of the lowest inference time of 8 minutes, which is roughly 0.24 seconds per test query. On the contrary INF-FT is 32× slower than in-context learning framework 100, as it needs to train the LM for 100 steps on each demonstration $D^s$ data during inference. Large LMs (OPT-{66B,30B,13B}) are also time consuming (19×-39× slower than in-context learning framework 100), as the model is too large to be loaded into a single GPU thus the model is split over multiple GPUs using Accelerate library. Besides, T5-large is slower than in-context learning framework 100 as it is not amenable to in-context learning and hence typically generate longer outputs.

Data experiments are also conducted to understand the role of each learnable soft prompt in in-context learning framework 100. An ablation on the size of soft prompts $p_g$, $p_d$ and $p_e$. In FIG. 10, it shows while reducing the length of $p_g$ to 50 slightly degrades performance, entirely removing it severely hurts the effectiveness of in-context learning framework 100. This shows that $p_g$ is a necessary component and it is important to provide a global context to the backbone LM. Next, it is observed that longer length for $p_d$ actually decreases performance while shortening its length keeps the performance comparable. This shows that 10-20 tokens might be a sweet spot for $p_d$. In other words, it is optimal to translate each demonstration example to 10-20 soft tokens. Note that reducing the length of $p_d$ to 0 token will reduce PROMPTTRANS to MetaICL-PT. Finally, the size of $p_e$ affects the representation capacity of the translation model and reducing its length naturally comprises the overall performance.

The in-context learning framework 10 pipeline in FIG. 2 augments original text context with translated soft prompts. FIG. 11 compares in-context learning framework 100 with two variations: (i) replace-input variation will remove only the inputs of demonstration examples and concatenate translated soft prompts and demonstration outputs in an interleaved manner: $C \leftarrow p_g \oplus p_1^s \oplus y_1^s \ldots p_n^s \oplus y_n^s$. (ii) replace-all variation will remove all demonstration context and only use translated prompts: $C \leftarrow p_g \oplus p_1^s \ldots p_n^s$. While replace input variation hurts PROMPTTRANS performance to some extent, it still outperforms MetaICL-Finetune. Whereas, the replace-all variation leads to a drastic performance degradation. Such results suggest a different role of the demonstration input and output data during in-context learning. While the inputs can be replaced by translated soft prompts, demonstration outputs are more critical and should be explicitly retained in context.

Figure 12:
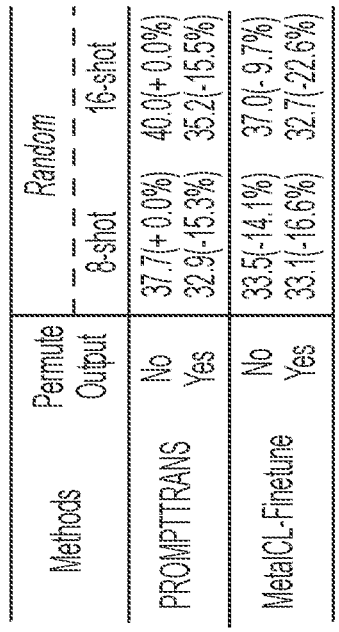

FIG. 12 shows the weighted relative gain per task group ($r_i^{w_i}$−1) of baselines compared to PROMPT-TRANS. It is observed that 1) MetaICL-{Finetune,PT} models perform worser than PROMPTTRANS in 4 out of 5 task groups. 2) large OPT models fall behind PROMPTTRANS on natural language understanding tasks but are better at generative tasks (Rouge-L, Exact-Match). This is because larger LMs trained with causal LM objective on larger-scale data are better at text generation than smaller LMs like T5-large, which was primarily trained with masked span prediction.

Figure 13:
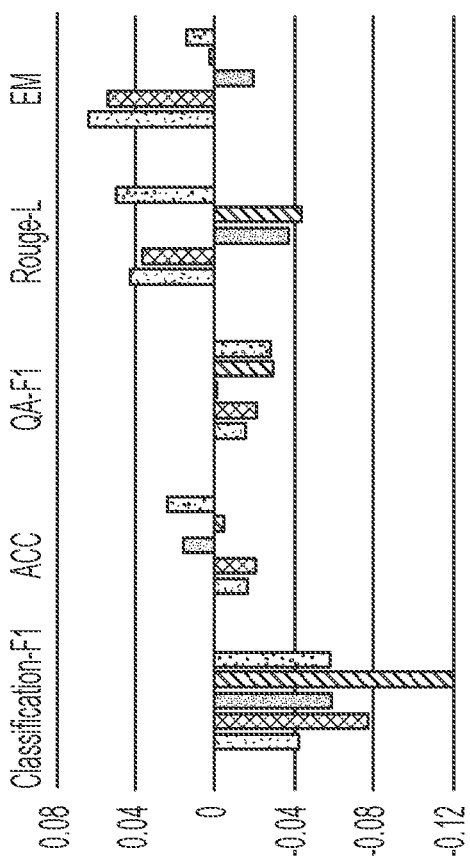

In realistic scenarios, there might be different number of demonstration examples available, especially during inference on an unseen test task. To understand how in-context learning framework 100 adapts to lesser number of demonstrations at inference, after being trained on 16-shot demonstrations, FIG. 13 shows the performance with regard to different support sizes. It is observed that in-context learning framework 100 is indeed more robust to variable number of demonstrations, compared to MetaICL-Finetune and Meta-ICL-PT.

Figure 14:
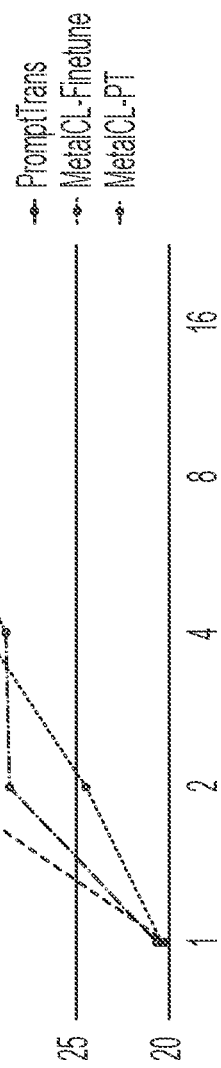

Randomizing the labels of demonstration examples "barely hurts performance". To verify if in-context learning framework 100 shows similar idiosyncrasies, an intervention is performed on demonstrations which permutes the outputs of examples among themselves. This will break the input-output mapping while ensuring that the output space stays intact. FIG. 14 shows the empirical results. While for 8-shot MetaICL-Finetune is not much affected by such intervention, in-context learning framework 100 is more sensitive to it and drops 15.3% in performance. In 16-shot case, both models are significantly hurt by such intervention.

In addition, in-context learning framework 100 is further compared with two instruction-tuned models T0++(11B) (Sanh et al., Multitask prompted training enables zero-shot task generalization, in proceedings of International Conference on Learning and Representation (ICLR), 2022) and FLAN-T5-xxl (11B) (Chung et al., Scaling instruction-finetuned language models, CoRR, abs/2210.11416, 2022). A reduced test set of 31 tasks in Random partition, after removing the overlapped tasks that are used in T0's training. The results show FLAN-T5-xxl is 3.1 points (or 2.8% in wGMRG) behind in-context learning framework 100 and T0++ is 20.7 points (68.7% in wGMRG) below in-context learning framework 100. Therefore, FLAN-T5-xxl may perform better than T0++ because it is trained with instructions containing demonstrations while T0++ is trained on pure task descriptions. Nevertheless, in-context learning framework 100 outperforms FLAN-T5-xxl which is trained on much larger corpus (1.8K tasks) with 14× parameters. Given its effectiveness of eliciting in-context learning on demonstrations, it is appealing to extend in-context learning framework 100 to elicit LMs to learn instructions (with or without demonstrations) in-context.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method for an in-context learning framework, the method comprising:
   receiving, via a data interface, one or more demonstration examples corresponding to one or more natural language processing (NLP) tasks, respectively;
   generating, by a neural network based prompt translation model implemented on one or more hardware processors, a first augmented context based on at least a first demonstration example corresponding to the first NLP task;
   concatenating the first augmented context and a first query that belongs to a training example sampled from a training dataset, the first query corresponding to the first NLP task into a combined input in response to receiving the first query;
   generating, by a neural network based language model implemented on one or more hardware processors, a first predicted task output from the combined input, in response to the received first query;
   computing a cross-entropy loss based on the first predicted task output conditioned on the concatenated first augmented context and the first query; and
   training the neural network based prompt translation model via backpropagation based on the cross-entropy loss while keeping the neural network based language model frozen.

2. The method of claim 1, wherein the first demonstration example includes a first token indicating a type of the first NLP task, a first text of a task input and a second text of a task output corresponding to the NLP task.

3. The method of claim 1, wherein the generating the first augmented context further comprises generating, by the neural network based prompt translation model, one or more soft prompts from one or more demonstration examples corresponding to the first NLP task, respectively.

4. The method of claim 3, wherein the generating the first augmented context further comprises:
   encoding, by an encoder of the neural network based prompt translation model, a concatenation of a tunable encoder prompt and at least one demonstration examples into an encoded representation; and
   generating, by a decoder of the neural network based prompt translation model, at least one soft prompt from the encoded representation and a tunable decoder prompt.

5. The method of claim 3, wherein the first augmented context is generated by concatenating a tunable global prompt, the one or more soft prompts and the one or more demonstration examples.

6. The method of claim 1, wherein the training the neural network based prompt translation model further comprises:
   updating parameters of attention layers within the neural network based prompt translation model, a tunable decoder prompt and an encoder prompt that are used within the neural network based prompt translation model, and a global prompt that is concatenated within the first augmented context.

7. The method of claim 1, wherein the first augmented context is pre-computed prior to receiving the first query, and wherein the method further comprises:

generating, by the neural network based language model implemented on one or more hardware processors, a second predicted task output from a concatenation of the first augmented context and a second query corresponding to the first NLP task, in response to receiving the second query.

8. A system for an in-context learning framework, the system comprising:
   a data interface receiving one or more demonstration examples corresponding to one or more natural language processing (NLP) tasks, respectively;
   a memory storing a neural network based prompt translation model, a neural network based language model and a plurality of processor-executable instructions; and
   one or more hardware processors executing the plurality of processor-executable instructions to perform operations comprising:
   generating by the neural network based prompt translation model a first augmented context based on at least a first demonstration example corresponding to the first NLP task;
   concatenating the first augmented context and a first query that belongs to a training example sampled from a training dataset, the first query corresponding to the first NLP task into a combined input in response to receiving the first query;
   generating, by the neural network based language model, a first predicted task output from the combined input, in response to the received first query;
   computing a cross-entropy loss based on the first predicted task output conditioned on the concatenated first augmented context and the first query; and
   training the neural network based prompt translation model via backpropagation based on the cross-entropy loss while keeping the neural network based language model frozen.

9. The system of claim 8, wherein the first demonstration example includes a first token indicating a type of the first NLP task, a first text of a task input and a second text of a task output corresponding to the NLP task.

10. The system of claim 8, wherein the operation of generating the first augmented context further comprises generating, by the neural network based prompt translation model, one or more soft prompts from one or more demonstration examples corresponding to the first NLP task, respectively.

11. The system of claim 10, wherein the operation of generating the first augmented context further comprises:
   encoding, by an encoder of the neural network based prompt translation model, a concatenation of a tunable encoder prompt and at least one demonstration examples into an encoded representation; and
   generating, by a decoder of the neural network based prompt translation model, at least one soft prompt from the encoded representation and a tunable decoder prompt.

12. The system of claim 10, wherein the first augmented context is generated by concatenating a tunable global prompt, the one or more soft prompts and the one or more demonstration examples.

13. The system of claim 9, wherein the operation of training the neural network based prompt translation model further comprises:
   updating parameters of attention layers within the neural network based prompt translation model, a tunable decoder prompt and an encoder prompt that are used within the neural network based prompt translation model, and a global prompt that is concatenated within the first augmented context.

14. The system of claim 8, wherein the first augmented context is pre-computed prior to receiving the first query, and wherein the operations further comprise:
   generating, by the neural network based language model implemented on one or more hardware processors, a second predicted task output from a concatenation of the first augmented context and a second query corresponding to the first NLP task, in response to receiving the second query.

15. A non-transitory processor-readable storage medium storing a plurality of processor-executable instructions for an in-context learning framework, the instructions being executed by one or more hardware processors to perform operations comprising:
   receiving, via a data interface, one or more demonstration examples corresponding to one or more natural language processing (NLP) tasks, respectively;
   generating, by a neural network based prompt translation model implemented on one or more hardware processors, a first augmented context based on at least a first demonstration example corresponding to the first NLP task;
   concatenating the first augmented context and a first query that belongs to a training example sampled from a training dataset, the first query corresponding to the first NLP task into a combined input in response to receiving the first query;
   generating, by a neural network based language model implemented on one or more hardware processors, a first predicted task output from the combined input, in response to the received first query;
   computing a cross-entropy loss based on the first predicted task output conditioned on the first concatenated context and the first query; and
   training the neural network based prompt translation model via backpropagation based on the cross-entropy loss while keeping the neural network based language model frozen.

16. The non-transitory processor-readable storage medium of claim 15, wherein the generating the first augmented context further comprises generating, by the neural network based prompt translation model, one or more soft prompts from one or more demonstration examples corresponding to the first NLP task, respectively.

17. The non-transitory processor-readable storage medium of claim 16, wherein the operation of generating the first augmented context further comprises:
   encoding, by an encoder of the neural network based prompt translation model, a concatenation of a tunable encoder prompt and at least one demonstration examples into an encoded representation; and
   generating, by a decoder of the neural network based prompt translation model, at least one soft prompt from the encoded representation and a tunable decoder prompt.

18. The non-transitory processor-readable storage medium of claim 17,
   wherein the training the neural network based prompt translation model further comprises:
   updating parameters of attention layers within the neural network based prompt translation model, a tunable decoder prompt and an encoder prompt that are used within the neural network based prompt translation model, and a global prompt that is concatenated within the first augmented context.

19. The non-transitory processor-readable storage medium of claim 15, wherein the first demonstration example includes a first token indicating a type of the first NLP task, a first text of a task input and a second text of a task output corresponding to the NLP task.

20. The non-transitory processor-readable storage medium of claim 15, wherein the first augmented context is pre-computed prior to receiving the first query, and wherein the operations further comprise:
   generating, by the neural network based language model implemented on one or more hardware processors, a second predicted task output from a concatenation of the first augmented context and a second query corresponding to the first NLP task, in response to receiving the second query.

* * * * *